Aug. 22, 1939.  E. WEBER  2,170,227
COLLAPSIBLE BABY CARRIAGE
Filed Oct. 1, 1938   3 Sheets-Sheet 1
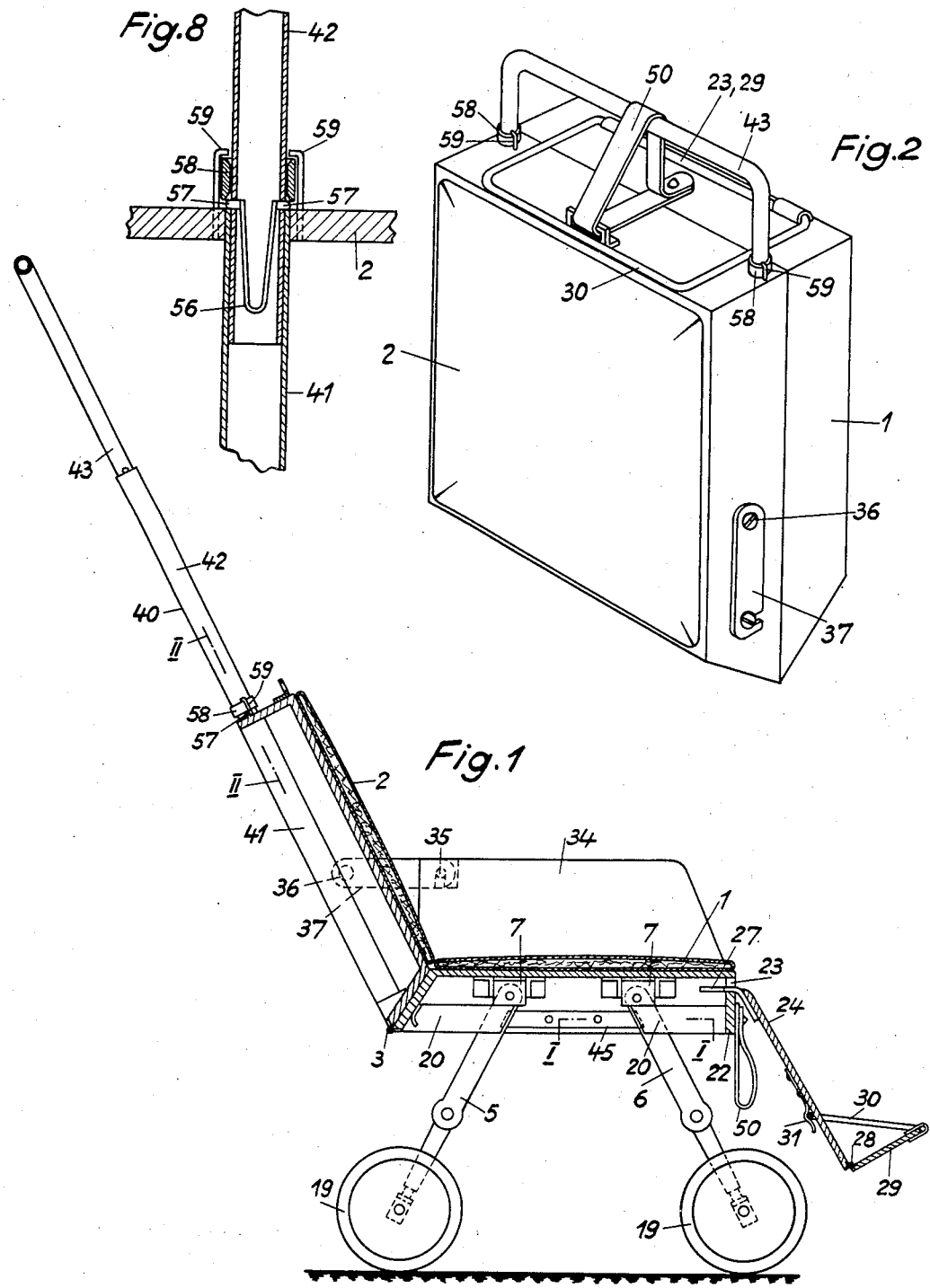
Inventor
Ernst Weber

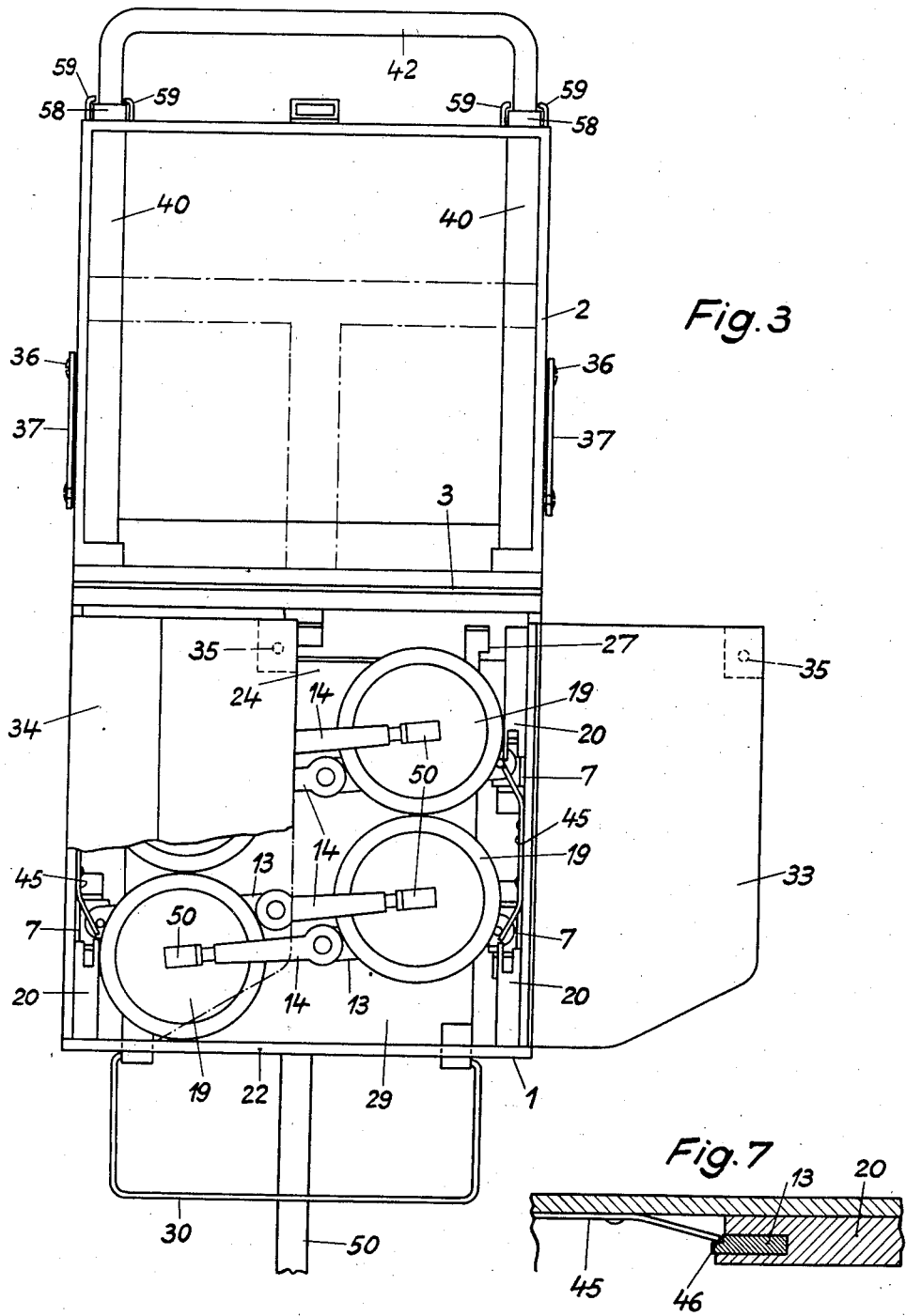

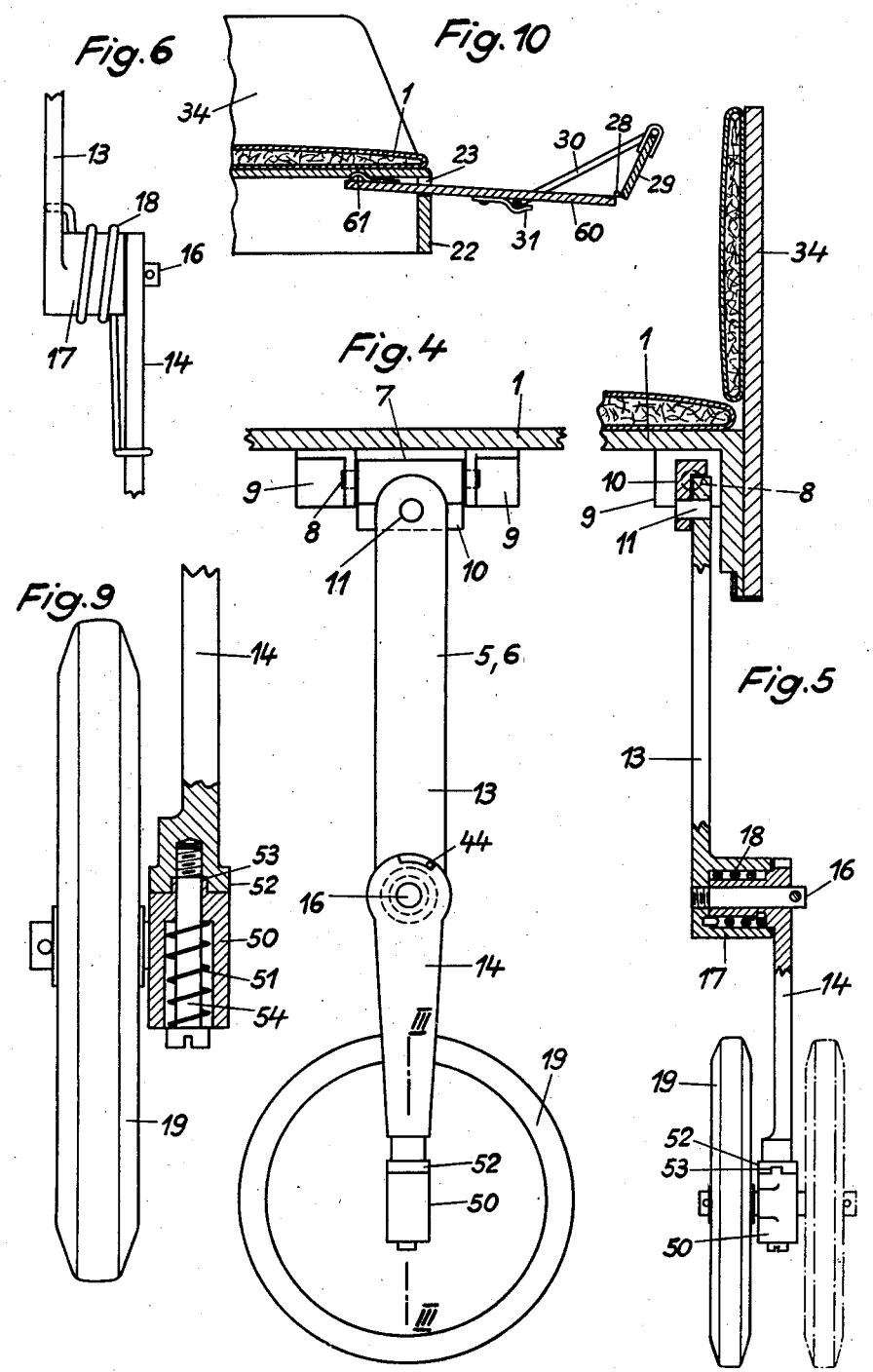

Patented Aug. 22, 1939

2,170,227

UNITED STATES PATENT OFFICE 2,170,227

COLLAPSIBLE BABY CARRIAGE

Ernst Weber, Baretswil, Zurich, Switzerland

Application October 1, 1938, Serial No. 232,731

9 Claims. (Cl. 280—37)

The subject of the present invention is a collapsible baby carriage. The novelty resides therein that the seat and back of the carriage are constructed in the form of shells and are hingedly connected together in such a manner that they can be folded together into a closed container in which space is provided for the wheels, the foot-rest and for other articles, such as handbags, children's soiled clothing and so forth. The complete container is light and when closed requires very little space. The handle of the carriage itself forms the handle for the closed container, which can be carried in one hand and is capable of being placed in the usual luggage carriers of railway vehicles, tramways and so forth.

A form of construction of the subject of the invention is illustrated by way of example in the accompanying drawings, wherein:

Fig. 1 is a vertical section of the baby carriage in the position of use.

Fig. 2 shows the baby carriage packed.

Fig. 3 is a plan of the seat and back of the baby carriage which have been turned through 180° relatively to the position shown in Fig. 2.

Figs. 4, 5 and 6 show details to a larger scale.

Figs. 7 and 8 are cross-sections on the lines I—I and II—II of Fig. 1.

Fig. 9 is a section on the line III—III of Fig. 4.

Fig. 10 shows a further detail.

The baby carriage shown consists of a seat 1 and a back 2. Both the seat 1 and the back 2 are in the form of shells. They are connected together by a hinge 3 and when folded together form the container shown in Fig. 2. To each of the lateral parts of the seat 1 are hinged two two-armed levers 5, 6, each arm 5, 6 being provided with a double hinge 7. The latter consists of a pin 8 rotatably mounted in two bearings 9. On the pin 8 is mounted a bearing member 10 in which one end of the arm 5 or 6 is rotatably mounted by means of a pin 11. The arm 5 or 6 can thus be swung in two planes at right angles to one another.

The two parts 13 and 14 of each arm 5 or 6, are hingedly connected together. For the purpose of connection there is provided a pin on which there is rotatably mounted the hub of the arm 14.

Between the hub of the part 14 and a bush 17 of the part 13 there is mounted a compression spring 18 (Fig. 5). If desired the latter may be located outside the bush 17 (Fig. 6) in such a manner that one end thereof engages with the arm 13 and the other with the arm 14. A pin 44 limits the rocking movement of the part 14 relatively to the part 13. At the free end of each arm 14 is rotatably mounted a wheel 19. As shown in Figs. 5 and 9 each wheel can be turned outwardly about its arm 14. For this purpose the wheel 19 is mounted on a bush 50 which is pressed upwardly against an enlargement 52 of the part 14, by the action of a spring 51. A bar 53 provided on the bush 50 engages with a corresponding groove in the enlargement 52 so as to prevent the bush from turning about its axis 54. After depressing the wheel with the bush the bar 53 is disengaged from the groove so that the two parts first mentioned can be turned through 180° about the axis 54. When released the bush 50, in consequence of the spring action, snaps upwardly and is thus again secured against turning. In the position of use the arms 5, 6 are inclined to the plane of travel.

The end position of the arms 5, 6 is ensured by stops 20 provided on the side wall of the seat 1. Whilst travelling the arms 5, 6 are thus held securely in position. The wheels 19 are arranged at a comparatively large distance apart so that the carriage acquires a good supporting surface. The springs 18 provide for efficient springing. To each of the two side walls of the seat 1 is secured a blade spring 45 which engages with a groove 46 of the parts 13 (Fig. 3) and thus secures these in the stops 20 as soon as the wheels with their arms have been brought into the position of use. By turning back the ends of the spring 45 each part 13 can be rocked out of its stop 20. In the front wall 22 of the seat 1 is provided a slot 23 in which is movably mounted a support 24. At its upper end the latter is provided with a bent bar 27 (Fig. 1), whilst to its lower end there is hinged, by means of the hinge 28, the foot-rest 29 which is held in the necessary angular position to the support 24 by a detachable link 30. The latter is secured in its position of rest by a blade spring 31. To the side walls of the seat 1 are also hinged the side boards 33, 34. To these side boards are secured pins 35. Catches 37 are hinged to the back 2 by pins 36 and serve to connect the back 2 to the side boards 33, 34 of the seat and thus to the seat 1 itself.

The parts 1 and 2 are firmly connected together in the position of use. In the lateral part 2 is secured the handle 40. The latter consists of parts 41, 42, 43, which telescope into one another. The part 43 is in the form of a loop and serves as the handlebar. In the extended position the parts 41 to 43 of the handle are prevented from relative movement. In the part 42 is provided a spring 56 of which the projections 57 are pressed into diametrically oppositely located openings. These projections, as shown in Fig. 8, rest on the upper edge of the part 41. A ring 58 is mounted for free rotation above the projection and the axial movement thereof, when pulling out the part 42 is limited by hooks 59. The part 43 is secured in the part 42 in the known manner, by means of springs and projections. Otherwise the seat 2 is empty. Into this may be placed a handbag, children's washing and so forth. The back and the seat may be provided with a cushion. In order to retain the parts in position when the container is closed there is also provided a strap 50. Instead of the support 24 there may also be provided, as shown in Fig. 10, a footboard 60 which when drawn out retains a position substantially parallel to the seat 1. To this footboard 60 there is hinged, by means of the hinge 28, a footrest 29 which is secured in position by the link 30 and the blade spring 31.

Near the rear end of the support 60 there is provided at least one projection 61 which projects into a recess provided in the under surface of the seat and thus prevents the footrest from accidental movement.

In order to fold the baby carriage, the two rings 58, are first slightly turned and pressed downwardly whereby the projections 57 are pressed inwardly against the action of the spring 56. By moving the handle-bar 43 downwardly the part 43 telescopes into the part 42 and the latter into the part 41.

The handlebar 43 then assumes the position shown in Fig. 2. It projects a sufficient distance from one side wall of the container to enable it to be used as a handle for carrying the container. The wheels 19 are turned inwardly under the seat 1 for which purpose the arms 5, 6 are first disengaged from the stops 20 and then bent towards one another.

By reason of the resilient hinge the arms 5, 6 can be bent and conveniently lodged in the seat 1. The footrest is folded flat by disengaging the link from the blade spring 31 and the footrest 29 is moved into the same plane as the support 24. These parts are then pushed into the interior of the seat through the slot 23. The catch 37 is disengaged, the side parts 32, 33 are placed over the wheels and then the two parts 1, 2 can be turned on the hinge 3 and the container thus closed. The handle 43 and the parts 1 and 2 are then secured by the strap 50.

The baby carriage may be constructed of wood, light metal, artificial or pressed material and so forth. To the extended handle 40 a hood may be secured by means of springs which engage with the tubular members of the handle.

I claim:

1. A collapsible baby carriage comprising in combination a back and seat hinged together, said back and seat being of box-like shape, a handle member mounted on said back, said handle member being adapted to be collapsed and into said back, a footrest mounted on said seat, wheels mounted on said seat, the arrangement being such that in the collapsed position the footrest and wheels are accommodated in said seat and said back, means for securing together said seat and back in the collapsed position so as to form a container, said handle member forming a handle for said container when the baby carriage is in the collapsed condition.

2. A baby carriage according to claim 1, including four wheels, four arms associated one with each wheel, each of said arms comprising two members which are pivotally connected together and a double-hinge connecting said arms to said seat, the dimensions of the arms and wheels being such as to be accommodated in the box-shaped seat.

3. A baby carriage according to claim 1, including four wheels, four arms associated one with each wheel, each of said arms comprising two members which are pivotally connected together and a double-hinge connecting said arms to said seat, the dimensions of the arms and wheels being such as to be accommodated in the box-shaped seat, a resilient hinge between each two parts of said arms, the resilient hinges forming the spring system of the carriage.

4. A baby carriage according to claim 1, wherein said handle member comprises a plurality of parts which telescope into one another and into said back.

5. A baby carriage according to claim 1, including side parts hingedly mounted to said seat, catches mounted on said back, pins on said side parts, said catches being adapted to engage with said pins whereby said side parts, seat and back are connected together.

6. A baby carriage according to claim 1, including a spring actuated connection between each of said wheels and said arms, said spring connection including a tongue and groove joint, the arrangement being such that said wheels can be locked in positions which are 180° apart.

7. A baby carriage according to claim 1, wherein said handle member comprises a plurality of parts which telescope into one another and into said back, a spring catch mounted on one of said telescoping members, the adjacent member having diametrically oppositely located holes therein, said spring catch being adapted to project through said holes so as to engage with the end of the adjacent telescopic member, a ring slidably mounted on one of said members, said ring having inclined surfaces in the interior thereof, said ring when moved serving to push said catch into the member so as to permit of relative movement between the two members, and means for holding said ring in the engaged position when the telescopic members have been fully extended.

8. A baby carriage according to claim 1, wherein said footrest comprises a support, a footboard hinged to said support, means for holding said footboard in a predetermined position relatively to said support, said support being slidably engaged with said seat, said footboard and said support being capable of being set in alignment and slid into said box-shaped seat when said baby carriage is collapsed.

9. A baby carriage according to claim 1, wherein said footrest comprises a support slidably mounted in said box-shaped seat, means for limiting the outward movement of said support from said seat, a footboard hingedly mounted to said support, a spring catch on said support, and links pivotally mounted at the free end of said footboard and adapted to engage with said catch so as to hold the footboard in the desired position relatively to said support, said support extending substantially horizontally from said seat when in the extended position.

ERNST WEBER.